(12) United States Patent
Rauhala et al.

(10) Patent No.: US 9,886,871 B1
(45) Date of Patent: Feb. 6, 2018

(54) FITNESS AND WELLNESS SYSTEM WITH DYNAMICALLY ADJUSTING GUIDANCE

(71) Applicant: PEAR Sports LLC, Solana Beach, CA (US)

(72) Inventors: Kari Kristian Rauhala, Solana Beach, CA (US); Robert G. Allison, Newport Beach, CA (US); Simon Sollberger, San Francisco, CA (US); Joseph Rzepiejewski, Dana Point, CA (US); Shimon Gersten, San Diego, CA (US)

(73) Assignee: PEAR SPORTS LLC, Solana Beach, CA (US)

( * ) Notice: Subject to any disclaimer, the term of this patent is extended or adjusted under 35 U.S.C. 154(b) by 642 days.

(21) Appl. No.: 13/720,936

(22) Filed: Dec. 19, 2012

Related U.S. Application Data

(60) Provisional application No. 61/580,569, filed on Dec. 27, 2011.

(51) Int. Cl.
   *G09B 19/00* (2006.01)

(52) U.S. Cl.
   CPC .................................. *G09B 19/00* (2013.01)

(58) Field of Classification Search
   CPC ........................... A63B 24/0075; G09B 19/00
   USPC ........................................................ 434/247
   See application file for complete search history.

(56) References Cited

U.S. PATENT DOCUMENTS

| | | | |
|---|---|---|---|
| 5,673,691 A | * | 10/1997 | Abrams et al. ............... 600/300 |
| 5,857,939 A | | 1/1999 | Kaufman |
| 5,890,997 A | | 4/1999 | Roth |
| 5,921,891 A | | 7/1999 | Browne |
| 5,976,083 A | | 11/1999 | Richardson et al. |

(Continued)

FOREIGN PATENT DOCUMENTS

| | | |
|---|---|---|
| CN | 101619986 A | 1/2010 |
| GB | 2293896 A | 4/1996 |

(Continued)

OTHER PUBLICATIONS

Barbeau et al. "The Travel Assistant Device: Utilizing GPS-Enabled Mobile Phones to Aid Transit Riders With Special Needs." *Presented at the 15th World Congress on Intelligent Transportation Systems.* New York. Paper No. 30429. (Nov. 16-18, 2008):1-12.

(Continued)

*Primary Examiner* — Thomas Hong
(74) *Attorney, Agent, or Firm* — Mintz Levin Cohn Ferris Glovsky and Popeo, P.C.

(57) ABSTRACT

A system is provided that provides guidance (e.g., audio content) to a user while exercising. This audio content is tailored to the particular user and is aimed at increasing the effectiveness of the exercising. In some cases, the audio content conveyed to the user can be based on one or more sensors providing various metrics (e.g., heart rate, cadence, breathing rate, galvanic skin response, temperature etc.) regarding the real-time performance of the user. In some cases, the guidance to a user may be downloaded dynamically to the device by a specialized server or wireless connection. In addition, the guidance can be dynamically adjusted based on a variety of factors including data obtained from the sensors. Related apparatus, systems, techniques and articles are also described.

22 Claims, 15 Drawing Sheets

(56) References Cited

U.S. PATENT DOCUMENTS

| | | |
|---|---|---|
| 6,249,542 B1 | 6/2001 | Kohli et al. |
| 6,251,048 B1 | 6/2001 | Kaufman |
| 6,453,111 B1 | 9/2002 | Sklar et al. |
| 6,458,060 B1 | 10/2002 | Watterson et al. |
| 6,582,342 B2 | 6/2003 | Kaufman |
| 6,672,991 B2 | 1/2004 | O'Malley |
| 6,702,719 B1* | 3/2004 | Brown ............... 482/4 |
| 6,716,139 B1 | 4/2004 | Hosseinzadeh-Dolkhani et al. |
| 6,997,852 B2 | 2/2006 | Watterson et al. |
| 7,003,122 B2 | 2/2006 | Chen |
| 7,062,225 B2 | 6/2006 | White |
| 7,097,588 B2 | 8/2006 | Watterson et al. |
| 7,166,062 B1* | 1/2007 | Watterson et al. ........ 482/8 |
| 7,175,601 B2 | 2/2007 | Verjus et al. |
| 7,251,454 B2 | 7/2007 | White |
| 7,278,966 B2 | 10/2007 | Hjelt et al. |
| 7,308,360 B2 | 12/2007 | Bou-Ghannam et al. |
| 7,409,288 B1 | 8/2008 | Krull et al. |
| 7,455,622 B2* | 11/2008 | Watterson ............ A63B 22/00 |
| | | 482/1 |
| 7,519,327 B2 | 4/2009 | White |
| 7,658,695 B1 | 2/2010 | Amsbury et al. |
| 7,702,457 B2 | 4/2010 | Matsunaga et al. |
| 7,741,975 B2 | 6/2010 | Shum et al. |
| 7,789,800 B1 | 9/2010 | Watterson et al. |
| 7,805,149 B2 | 9/2010 | Werner et al. |
| 7,811,201 B1 | 10/2010 | Mikan et al. |
| 7,841,967 B1 | 11/2010 | Kahn et al. |
| 7,909,737 B2 | 3/2011 | Ellis et al. |
| 7,931,563 B2 | 4/2011 | Shaw et al. |
| 7,962,284 B2 | 6/2011 | Cutitta, II |
| 8,033,959 B2* | 10/2011 | Oleson et al. ............ 482/9 |
| 8,386,166 B2 | 2/2013 | Jones et al. |
| 8,386,170 B2 | 2/2013 | James |
| 8,506,457 B2* | 8/2013 | Baudhuin ............... 482/57 |
| 8,568,145 B2* | 10/2013 | Jastrzembski et al. ...... 434/219 |
| 9,119,983 B2* | 9/2015 | Rhea ............... A63B 24/00 |
| 2003/0088196 A1 | 5/2003 | Steve |
| 2003/0171189 A1 | 9/2003 | Kaufman |
| 2004/0153007 A1 | 8/2004 | Harris et al. |
| 2005/0192025 A1 | 9/2005 | Kaplan |
| 2005/0202934 A1 | 9/2005 | Olrik et al. |
| 2005/0209050 A1 | 9/2005 | Bartels |
| 2006/0074555 A1 | 4/2006 | Liu et al. |
| 2007/0021269 A1 | 1/2007 | Shum |
| 2007/0135264 A1 | 6/2007 | Rosenberg |
| 2007/0225118 A1 | 9/2007 | Giorno |
| 2007/0243974 A1 | 10/2007 | Li et al. |
| 2008/0005276 A1* | 1/2008 | Frederick ............ G06Q 10/109 |
| | | 709/218 |
| 2008/0108481 A1 | 5/2008 | Limma et al. |
| 2008/0109158 A1 | 5/2008 | Huhtala et al. |
| 2008/0183385 A1 | 7/2008 | Horn |
| 2008/0305933 A1 | 12/2008 | Chang |
| 2009/0047645 A1* | 2/2009 | Dibenedetto ..... H04M 1/72563 |
| | | 434/258 |
| 2009/0069156 A1* | 3/2009 | Kurunmaki ........ A63B 24/0062 |
| | | 482/9 |
| 2009/0075781 A1 | 3/2009 | Schwarzberg et al. |
| 2010/0048358 A1 | 2/2010 | Tchao et al. |
| 2010/0056341 A1 | 3/2010 | Ellis et al. |
| 2010/0095209 A1 | 4/2010 | Gupta et al. |
| 2010/0190609 A1 | 7/2010 | Shum et al. |
| 2010/0197463 A1 | 8/2010 | Haughay, Jr. et al. |
| 2010/0216601 A1 | 8/2010 | Saalasti et al. |
| 2010/0292050 A1* | 11/2010 | DiBenedetto ...... A63B 24/0062 |
| | | 482/9 |
| 2010/0317489 A1 | 12/2010 | Flaction |
| 2010/0331147 A1 | 12/2010 | Mikan et al. |
| 2011/0003664 A1 | 1/2011 | Richard |
| 2011/0071003 A1 | 3/2011 | Watterson et al. |
| 2011/0087137 A1 | 4/2011 | Hanoun |
| 2011/0092337 A1 | 4/2011 | Srinivasan et al. |
| 2011/0105279 A1 | 5/2011 | Herranen |
| 2011/0152696 A1 | 6/2011 | Ryan |
| 2011/0153194 A1 | 6/2011 | Bellerose |
| 2011/0273552 A1* | 11/2011 | Wang et al. ............ 348/77 |
| 2012/0109657 A1 | 5/2012 | Partan |
| 2012/0253663 A1 | 10/2012 | Hani et al. |
| 2013/0040271 A1* | 2/2013 | Rytky et al. ............ 434/247 |
| 2013/0173155 A1 | 7/2013 | Fino |
| 2013/0196821 A1 | 8/2013 | Watterson et al. |
| 2013/0345975 A1 | 12/2013 | Vulcano et al. |
| 2015/0081062 A1 | 3/2015 | Fyfe et al. |
| 2015/0081210 A1 | 3/2015 | Yeh et al. |

FOREIGN PATENT DOCUMENTS

| | | |
|---|---|---|
| GB | 2454705 A | 5/2009 |
| KR | 20120010848 A | 2/2012 |
| WO | WO-94/02904 A1 | 2/1994 |
| WO | WO-99/49279 A1 | 9/1999 |
| WO | WO-2009/003890 A1 | 1/2009 |

OTHER PUBLICATIONS

Holland et al. "AudioGPS: spatial audio in a minimal attention interface." *Personal and Ubiquitous Computing.* 6(4):(2002); 14 pages.

Schoning et al. "WikEar—Automatically Generated Location-Based Audio Series between Public City Maps." *In adjunct Proc. of Ubicomp '07.* (2007). 4 pages.

"Single Language GPS Commentary Systems." AudioConexus. Web. Jul. 9, 2013. 3 pages.

* cited by examiner

FIG. 6

FITNESS AND WELLNESS SYSTEM WITH DYNAMICALLY ADJUSTING GUIDANCE

CROSS REFERENCE TO RELATED APPLICATION

The present application claims priority under 35 U.S.C. § 119 to U.S. Provisional Application Ser. No. 61/580,569, filed Dec. 27, 2011, entitled FITNESS AND WELLNESS SYSTEM WITH DYNAMICALLY ADJUSTING GUIDANCE, the disclosure of which is incorporated herein by reference

TECHNICAL FIELD

The subject matter described herein relates to a system that provides real-time and dynamically adjustable guidance to a user undergoing physical exercise/training and/or wellness routines based on the performance of the user as monitored by one or more sensors.

BACKGROUND

Athletes and non-athletes are increasingly using training plans for their workouts. These training plans specify certain exercises/routines and corresponding goals and, in some cases, can include areas for the user to record his or her results (e.g., finished, times, weight levels, etc.). A training plan can include one or more individual workouts. Current training plans are typically offered as a hard copy/print out plan. With written training plans, the user can see all the workouts assigned to him or her and the dates when they need to be done. With a static audio plan the user is getting instruction but without any real-time guidance related to form, time or performance. With video plans, the user sees the workout but is limited to exercising in an area where there is access to a video monitor. In all cases, the user is without the benefit of feedback and without the benefit of a coach who can monitor and adjust the workout intensity or other relevant features of the workout. Without a personal coach, it is the responsibility of the user to understand and remember the workout and how to execute it properly per the plan. It can be very difficult to remember the details of complex workouts and keep track of such timing and efforts without distractions of reading the training plan (and recording entries in the training plan such as heart rate). In addition, such training plans can also be difficult for the casual or occasional user to accurately follow and to understand if the intensity of the effort is in line with the plan.

Training plans (and workouts) often specify heart rate (HR) zones in order to define the intensity and the stress on the body of a user. However, it can be very difficult to know/understand the relative HR for the user and to perform the workouts within certain HR zones to make them most effective. As a result, most people who casually exercise or exercise without a coach are likely to perform their workouts ineffectively or incorrectly. Such poor performance result in limited or very slow progress towards their exercise/fitness goal and can be un-motivating and undermine the goal.

SUMMARY

Systems and techniques are described that provide guidance (e.g., audio-based guidance, etc.) and biometric feedback to a user undergoing physical exercise and/or wellness routines to maximize/optimize the effect of the physical exercise (sometimes according to a pre-defined training plan or other training content). The audio guidance can be triggered based on pre-defined criteria such as time intervals and/or it can be triggered based on measured performance metrics from one or more sensors coupled to and/or characterizing a user. The guidance can be triggered by an action of a user (e.g., pressing a button, etc.).

In one aspect, data is accessed that comprises a training plan that specifies at least one workout. Each workout specifies at least one physical exercise and associated performance parameters relating to the at least one physical exercise. Thereafter, data is received during a workout by a user according to the training plan that characterizes at least one of a physiological measurement of the user, a position of the user, and an environment of the user. Next, guidance to provide to the user is determined, based on the received data and using the training plan, for the user to comply with the training plan and the associated performance parameters. Subsequently, provision of the guidance to the user is initiated in real-time during the workout to allow the user to adjust his or her workout accordingly.

At least a portion of the received data can be generated by at least one sensor. The at least one sensor can include at least one biometric sensor characterizing at least one physiological measurement taken from the user during the workout. The at least one biometric sensor can characterize a variety of attributes including, for example one or more of: a heart rate of the user, a distance travelled by the user during the workout, a current speed of the user during the workout, a power metric relating to the workout, a cadence of the user during the workout, a number of calories burned by the user, a breathing rate of the user, a galvanic skin response of the user, and body temperature of the user. The data from the at least one biometric sensor can be received continuously and in real-time during the workout such that the guidance adapts based on the data received from the at least one biometric sensor, the training plan, and the associated performance parameters.

The guidance can take a variety of forms, including, for example, audio guidance and video guidance. The training plan can comprise a plurality of workouts each having different training criteria. At least two of the workouts can have differing associated performance parameters. The training plan can be selected based on performance of the user during historical workouts.

The accessing, receiving, and determining can be performed by a portable device worn by the user comprising at least one data processor and memory. The portable device can include at least one of headphones and a display interface. The portable device and the headphones can, in some variations, be integrated. The portable device can wirelessly communicate with at least one sensor characterizing performance of the user during the workout. The portable device can be a mobile phone.

The training plan can be selected among a plurality of training plans by the user via an online portal. Each training plan can include metadata characterizing one or more attributes of the training plan such that the metadata is searchable by the user via the online portal. Each workout can include metadata characterizing one or more attributes of the workout such that the metadata is searchable by the user via the online portal.

The guidance can include information characterizing at least one of: elapsed time of the workout, a distance travelled by the user during the workout, a current speed of the user during the workout, a power metric relating to the workout, a cadence of the user during the workout, a number of calories burned by the user, a breathing rate of the user, a galvanic skin response of the user, and body temperature of the user. In addition or in the alternative, the guidance can include at least one of: a current time, a current altitude of the user, a current location of the user, weather at the current location of the user, messages from third parties to the user, hydration prompts to the user, and food prompts to the user.

The training plan can include two or more concatenated workouts. The training plan can include training content that coaches the user follow to an exercise routine. The training content can be used to provide adjustable guidance to the user in real-time based on the performance of the user. The guidance can be variable based on criteria specified by the training content. The criteria can include one or more of calories burned by the user during the workout, weight loss of the user during the workout, and temperature of the user during workout. The training content can be broadcasted to a plurality of users concurrently engaging in the workout. The training content can be stored on a training content server that is accessible by at least one computer network. The training content server can store a profile for the user that includes performance data regarding historical workouts and associated training plans.

The training plan can be generated using a training content generator platform. The training content generator plan can provide a graphical user interface for generating training plans. The training content generator can allow a user to specify, for a workout, one or more of: activity intensities, nutrition guidelines, and hydration guidelines.

The guidance can be provided in response to the user activating an element on a portable device worn by the user during the workout. The guidance is pushed to the user during the workout based on the received data.

The training plan can be selected based on a heart rate test previously executed by the user. The heart rate test can provide guidance to the user requiring various levels of exertion while, at the same time, monitoring a heart rate of the user.

In some cases, advertisements are provided to the user during the workout and/or when selecting and/or configuring the training plan.

The current subject matter can be implemented using a variety of devices and architectures ranging from a fully integrated single device without network connectivity to a distributed device communicating with various components such as the biometric sensors via directed paired connections and to a hybrid combination of both with (continual or periodic) access to a computer network.

In one variation, the accessing, receiving, and determining are performed by a portable device worn by the user that includes at least one data processor and memory. The portable device can include at least one of headphones and a display interface in order to provide the guidance. In some cases, the headphones are integrated into the portable device while in other implementations the headphones are connected via an audio jack and/or are wirelessly paired to the portable device. The portable device can be a dedicated hardware device or some or more of the aspects of the portable device can be provided by a smart phone (e.g., an IPHONE or a phone compatible with the ANDROID or WINDOWS operating systems, etc.).

In an interrelated aspect, data comprising a training plan that specifies at least one physical exercise and associated performance parameters is accessed. Thereafter, data is received from at least one exercise machine characterizing interaction by a user with the exercise machine during a workout. It is then determined, based on the received data and using the training plan, guidance to provide to the user during the workout in order to comply with the training plan. Subsequently, provision of the guidance is initiated to the user in real-time during the workout to allow the user to adjust his or workout accordingly. Biometric sensors can also be employed that are used to determine guidance to provide to the user when using the exercise machine.

In an interrelated aspect, a virtual race is initiated amongst a plurality of portable device. Each portable device is used by a different single user of a plurality of users and each portable device includes data characterizing a training plan associated with the virtual race. Thereafter, the portable device monitors performance of each user while engaging in the virtual race. It is determined, based on the monitored performance and using the training plan, guidance to provide to each user during the workout in order to comply with the training plan. Subsequently, guidance to the user is initiated in real-time during the virtual race to allow each user to adjust his or performance accordingly.

In a further interrelated aspect, data is received that is generated from at least one biometric sensor characterizing performance of a user in connection with each of a plurality of a plurality of workouts in relation to respective training plans. Thereafter, data is generated including at least one analytic characterizing the performance of the user in relation to the training plans. Data is then generated that includes at least one report based on the generated at least one analytic that provides a view of the at least one analytic. The report can be provided in a variety of manners including displaying, loading, storing, and transmitting to a remote computing device.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, by utilizing real-time sensor data, the current subject matter can give real-time guidance and performance correcting instruction to a user exercising to help optimize his or her workout. This real-time guidance is also advantageous in that it dynamically adjusts based on the sensor data and is conveyed to the user through an auditor prompt (which obviates the need for the user to check a written training plan and/or consult a handheld or wrist worn/mounted device, etc.). In addition, the current subject matter can be used to identify an appropriate training program (warmup, workout intensity, recover, etc.) for a particular user based on his or her historical and/or real-time performance.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 is a second view of a portal providing various training plans;

DETAILED DESCRIPTION

Figure 1:
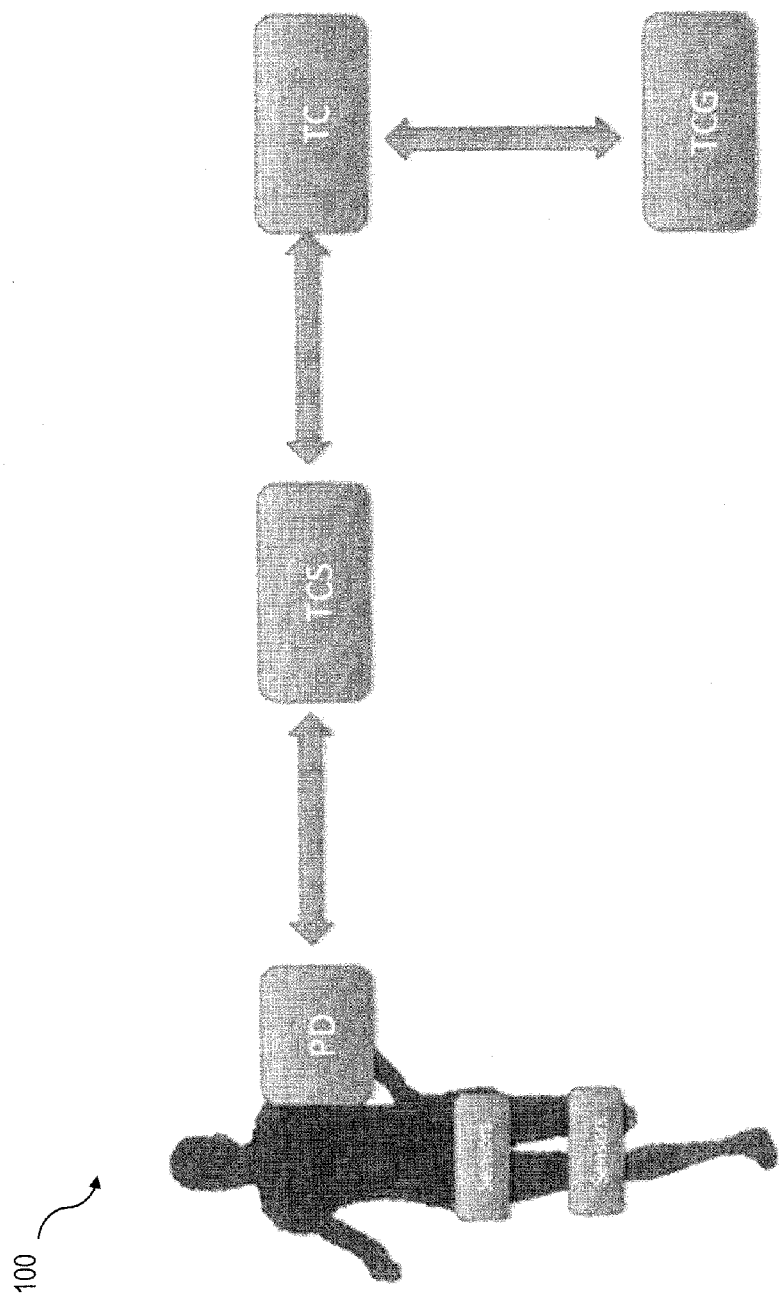
FIG. 1 is a diagram illustrating an integrated training system.

FIG. 1 is diagram 100 illustrating a user wearing one or more sensors and utilizing a portable device (PD) (as will be further described below). The PD downloads content (either wirelessly or via a removable wired connection directly or via a remote computer) from a Training Content Server (TCS) (further defined below). The user carries the PD while exercising (e.g., coupled to a waistline of the user, strapped to an arm of the user, etc.). The PD can output audio to the user (either via a built-in speaker or via wired/wireless headphones). The PD can receive and measure user performance data via the different sensors. While the diagram 100 of FIG. 1 illustrates the use of two sensors, it will be appreciated that any number of sensors that characterize the performance of the user while exercising can be used (including a single sensor). Such sensors may be wirelessly connected to the PD and/or physically integrated with the PD. As will be described in further detail below, the PD can be integrated into the headphone fully or partially (see the diagram 200 of FIG. 2, configurations 3, 4), be in-line with the audio/media source (see diagram 200 of FIG. 2, configuration 2) or it can be integrated to a media source (e.g., a music player such as an IPOD, etc.). PD can also act as a performance storage device that record one or more sessions of workout which can then be uploaded to TCS for review.

Figure 2:
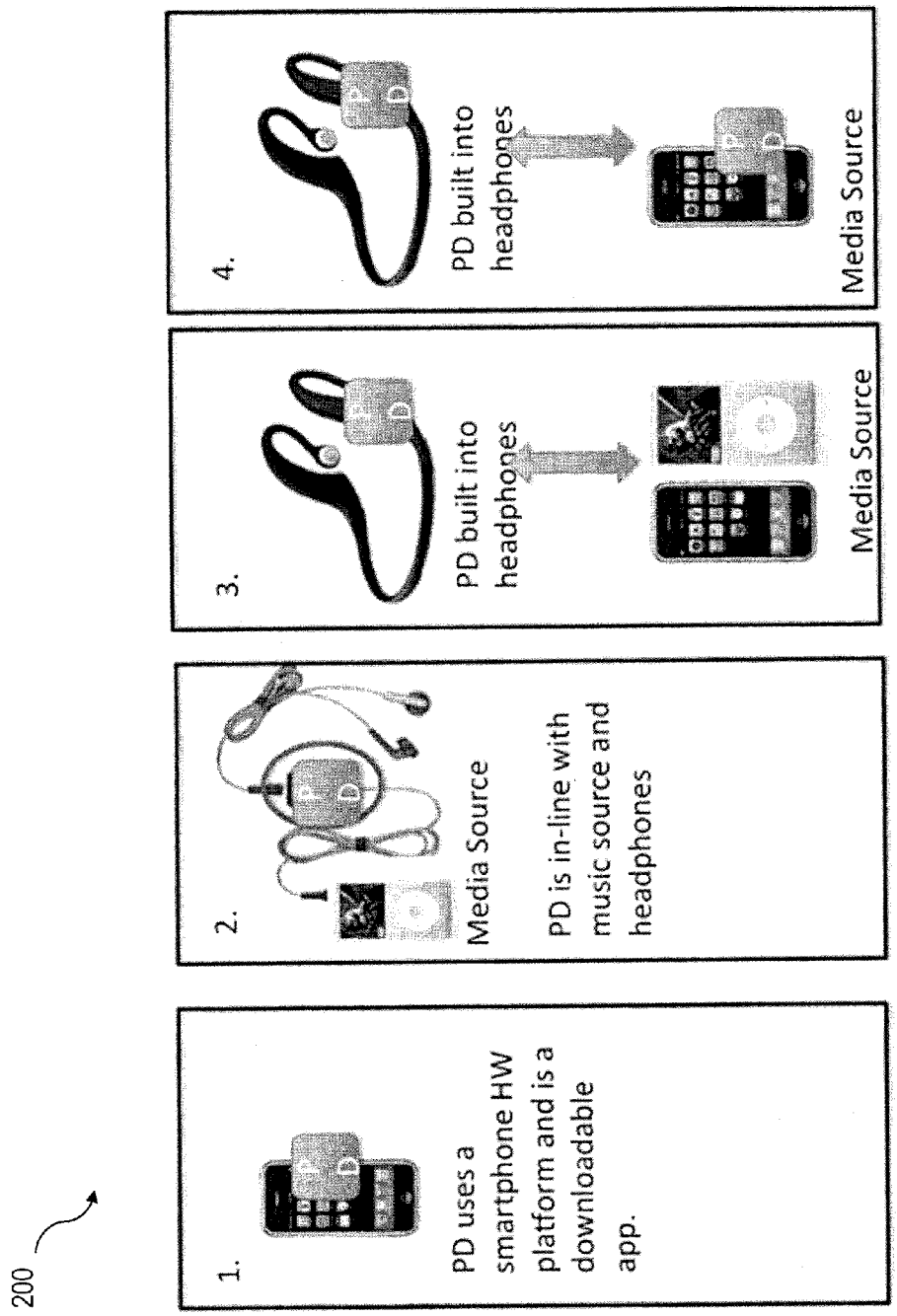
FIG. 2 is a diagram illustrating various implementations of an integrated training system.

FIG. 2 is a diagram 200 that illustrates four sample configurations of the PD (it will be appreciated that other configurations consistent with the current description can also be implemented). With the first configuration, the PD is part of a media source (e.g., smart phone hardware platform such as an IPHONE, an ANDROID-based phone, etc.). Audio delivered by the media source can be commingled with commands/data from the PD. With the second configuration, the PD is in-line with a media source and headphones. For example, the PD can be coupled/connected to the audio jack of a media source (e.g., IPHONE, etc.) and additionally has headphones extending therefrom (the PD can have integrated headphones or it can have an audio jack). With a third configuration, the PD is integrated into headphones (or integral with the headphones) and connected to a media source. With this variation, the media source does not have any special client software relating to the PD. With a fourth configuration, the PD is built into the headphones and additionally, the media source has resident client software to implement some of the aspects described herein.

In other implementations, the PD can communicate with Fitness Equipment (FE) such as a treadmill, elliptical trainer, rowing machine, etc. either directly or via a network (e.g., Internet, local network, etc.). The PD can receive sensor feedback from FE sensors, communicate to the TCS via the FE and/or the FE can have training content (TC as defined below) available for the PD. With such arrangements, the FE can act as one of the sensors characterizing the performance of the use. In addition, the PD can send workout results to the FE for display and further to the TCS (i.e., the FE is almost acting like a laptop/PC). The PD can also connect to the FE and the FE can be used as a display for the measurements/routines/guidance, etc. of the user.

In other implementations, the PDs can connect to other PDs directly or via TCS (and a network, etc.) to create a virtual race (i.e., the PDs can all use the same TC and the linked PDs or the TCS compare the results). The user can hear that 'You are 2nd in the race, keep it up'—this could be done real-time with other PDs or non-realtime based on results that had been logged by other PDs to the TCS.

Portable Device (PD).

The PD can have a variety of interfaces for acquiring data from the sensors, providing guidance to users, devising training plans, and for characterizing post-workout performance. The PD can have an acoustic interface that provides, for example, voice prompts and voice/speech recognition for setup, operation and control of the PD. The PD can have a gestural interface such that certain modes and functions might be accessed with specific head movements (e.g., nodding, etc.). The gestural interface can require one or more accelerometers or other sensors to characterize relative body movement of the user (i.e. the PD can be controlled by the sensors worn or used by the user).

The guidance provided by the PD can interrupt content being played by the media source and/or it can overlay such content (with the volume of the media source content being temporarily reduced such that the PD guidance can be heard). In some cases in which the PD is integrated with the media source and/or the PD includes a two-way communication interface to a media source, the PD can use and select appropriate music tempo matched to desired TC stride rate/cadence. The user can also select which songs to play at any given time (and in some cases, the available songs can be grouped according to their tempo, intensity, etc.). With such an arrangement, tempo information for various songs can be stored on the media source and accessed by the PD.

The PD can bridge ANT+ and Bluetooth to enable use of different sensors operating in ANT+, BT low energy or BT for music (see diagram 200 FIG. 2, configuration 4). Currently there are few wireless protocols for reporting sensor data (ANT, Blue Tooth (BT), BT_Low_Energy (BT_LE), and others). This causes several interoperability issues. With the use of the PD, the PD can be built to bridge and receive different wireless protocols and make them interoperable. For example, a ANT HR monitor may report data over ANT+ radio, but a smart phone may transmit BT. The PD may receive the ANT data and send it to the media source (for example, via BT, etc.) where some of PD processing is done. WiFi can be employed by the PD for automatically syncing with one or more remote services.

The PD can also include a removable media card slot (such as SD card). The media card can be used to provide TC and other media. The media card can also include user settings, such as age, heart rate zones, max heart rate, etc. The media card may also include music to be played for the user. In one arrangement, the media card can receive workout performance data or other data recorded by the PD. In addition, the media card can be connected (either directly or indirectly) to a computer/cell phone/etc. to download new TC and to upload workout results to TCS The PD and sensors can be made waterproof to be suitable for swimming training which enables audio feedback during the swim without the need to stop to listen to the coach. In addition, PD can have built in circuit to harvest kinetic energy from user movement and/or from solar cells. This energy may be used to charge the internal battery. In addition, the PD can have various sensors (e.g., position sensors, etc.) which can be used to provide training content (TC) which is based on the position of the user and/or the position information can be used to identify when a certain portion of a workout (e.g., swimming prior to cycling, etc.)

Training Content (TC).

TC can be characterized as a workout routine that coaches the user to follow an exercise routine (as specified, for example, in a training plan, etc.). The TC can be adjusted real-time while the user performs the routine based on the intelligence the PD has (or as it receives real-time performance date from sensors or statistics from history, past performance, weather conditions, from a remote coach, etc.). The TC can comprise audio feedback/coaching/or non-coaching contextual segments that instructs the user to perform the workout routine, soothing audio, technique tips, etc. Each audio segment of TC can have an audio title that describe the TC content—such as '1 h Interval run'. The user can listen to each title before selecting a TC on the PD. In addition to dynamic guidance—the TC can provide (on demand) performance information (time, distance, speed, power, cadence, calories) and contextual information (actual time, altitude, location, weather, messages from friends, hydration and food prompts) and training information (book on tape) "most runners make the mistake of going too hard but not frequent enough".

TC can be constructed of steps that are measured in time, distance, calories burned, etc. The TC can also recommend hydration and calorie intake during user performance. These can be calculated based on burned calories and measure weight loss (sweat), user temperature, and the like (as measured by or derived from one or more of the sensors). For each step, TC can have intensity targets such as HR, Speed, Power, Cadence. Each TC can have associated coaching audio files to cover each coaching scenario. The audio files can be indexed in a way that the PD knows what audio file needs to be played at any given time or intensity. The TC can be adapted during the exercise based on external feedback (i.e. remote coach can send the PD new audio prompts wirelessly) or based on current sensor readings, such as environmental factors. The PD can calculate appropriate coaching to the user depending on user's performance (or expected performance, predicted outcome, or past performance, or statistics on other users performing the same TC) during the steps relative to the targets and will play the related audio file or may instruct the user to choose a different workout or Training Plan (TP).

Several TC files can be used in combination to construct an audio-based TP (which results in a series of performance-related milestones, etc.). For example, the TP can adjust dynamically (based on two or more TC files) based on user performance. In addition, the TC files can be connected to reflect a multi-event/routine exercise such as swim—cycle—run, etc. The PD can detect when each of the events/routines are completed so that the next event/routine can be automatically initiated. TP can be characterized as a longer-term progress to improve fitness, lose weight, etc. A user performs the workout and follows the TC and a log file can be generated to record the performance. This log file can be uploaded to the TCS for further analysis.

As stated above, the TC can be a description of the workout in steps. One of several steps joined together construct the workout. The steps can include coaching points dispersed in time/distance/calories, that link to certain audio files. The coaching points can comprise a static pre-recorded audio file to be played to the user based on current time/distance/calories burned and/or one or more coaching messages. The coaching messages can be played based on the sensor readings such as bio-metric HR information/environmental sensors feedback or based on history of past events/statistics of the user or other users.

Figure 11:
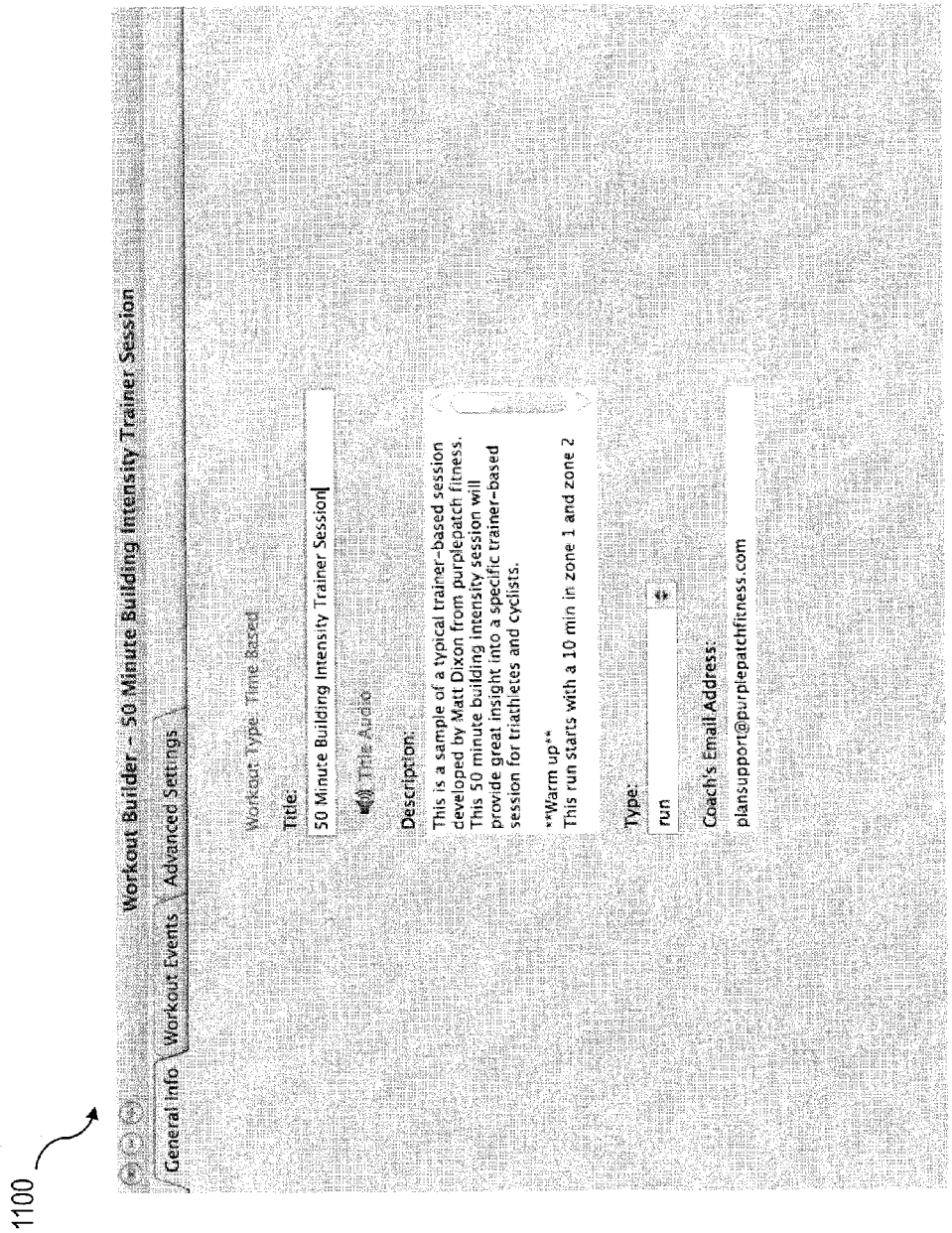
FIG. 11 is a view of metadata being specified/attached to a workout.

The TC file or structure can also include workout metadata that may describe the workout's attributes and information related to the workout. The metadata is part of the TC file structure. The attributes of the workout can be the sport (such as running, cycling, yoga, etc.), overall difficulty level, workout intensity, the terrain it is suitable for (i.e. for hills), what equipment may be needed to perform the workout, etc. The TC metadata can be used by the PC or TCS to select and recommend workouts to the user. The metadata can be used to filter TC from the TCS based on a user's current fitness level or profile, based on location, based on equipment available (i.e. RFID recognized workout equipment). Further the TC metadata can include author information, commercial information (price, sponsor, etc.). The TC may also include audio files that are advertising messages. FIG. 11 is a view 1100 that illustrates an interface for specifying metadata so that it can be associated with a workout/training plan. As noted above, the metadata can include difficulty, coach name, type of workout, title of workout, duration, distance, advertising info, and more.

Training Content Server (TCS).

The TCS can be a remote or on premise server that is accessible by the PD directly, wirelessly or accessible via the media source (e.g., IPHONE, etc.) over a communications network such as the Internet. In addition, or alternatively the functionality of the TCS can be provided locally on a smartphone or table computer app (e.g., IPAD app, etc.). In addition, a user can connect to the TCS via a standard PC (e.g., the TCS can be accessed via a website or it can form part of resident client software, etc.) The TCS can be coupled to a plurality of PDs so that real-time guidance/ coaching can be provided to each user. In some cases, the guidance of a first user can be based on the performance of a second user. For example, in competitive situations in which the first user seeks to have a better time than the second user or when the first and second users are working out together. In addition, for certain applications such as wellness or gym-based workouts, the TC can be broadcasted to PDs of users (which the users can accept). Examples include a spin class, a group beach workout, cross-country trail running, etc.

The TCS can store/host a user profile for the user, TC, fitness statistics, training plans (TPs), and other information relating to the user for the PD to access such as maps, etc. The TCS can authenticate each user (e.g., by measured heart rate, voice recognition, etc.) and device to be able to offer new TC for download and upload executed TC log files. In addition, TCS is a platform for coaches that can enable coaches to create and publish TC and as well, 'manage' athletes and measure and recommend new TC (i.e., the coaches can define new TPs via a website which are downloaded (automatically or on-demand) to the PDs of their various athletes). In addition, TCS can also have built-in intelligence to analyze user profile, TC log files to assess users' fitness level, recommend new TC, alert the user/doctor/coach of health issues, etc. In addition, TCS can have a commerce option that enables users to buy TC, coaching services, etc. The TCS can also send targeted advertising to users in the system based on analysis of their workouts/profile/etc.

Figure 5:
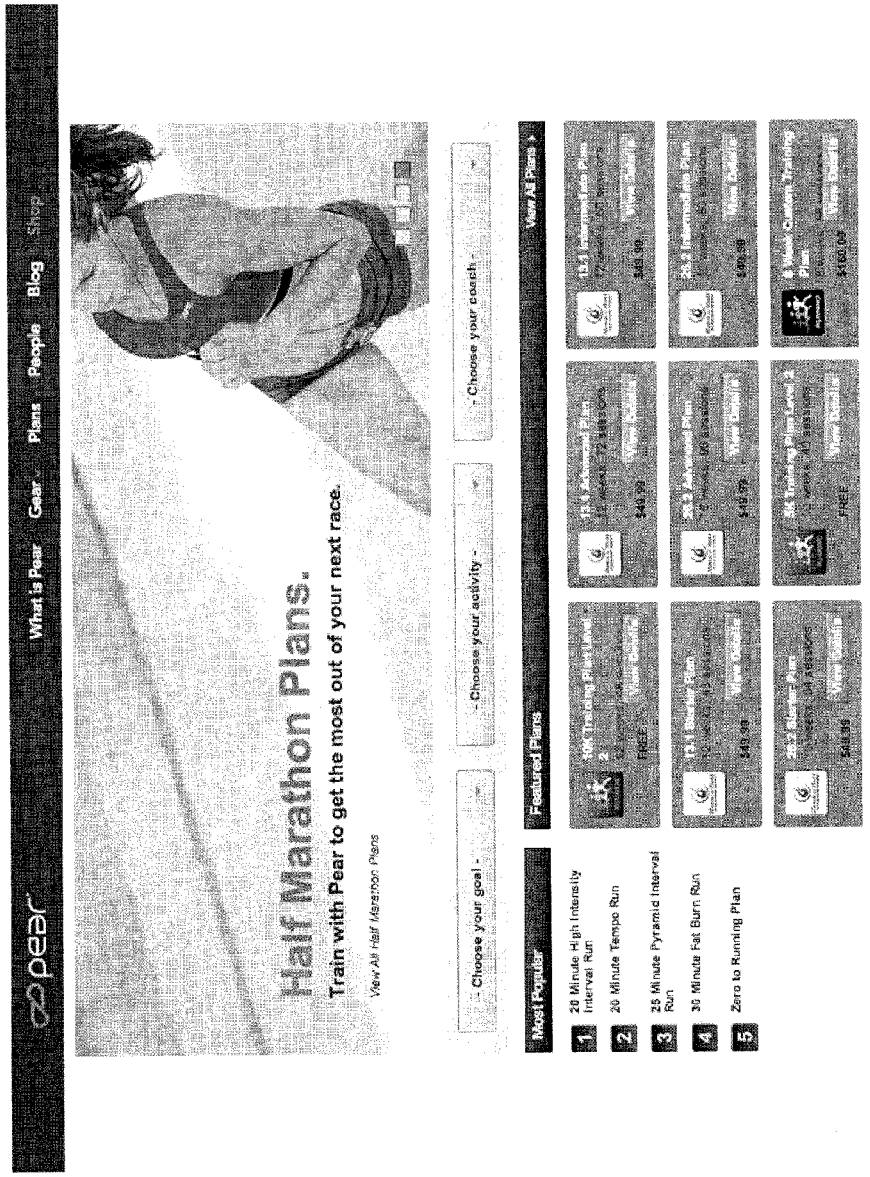
FIG. 5 is a first view of a portal providing various training plans.
Figure 6:
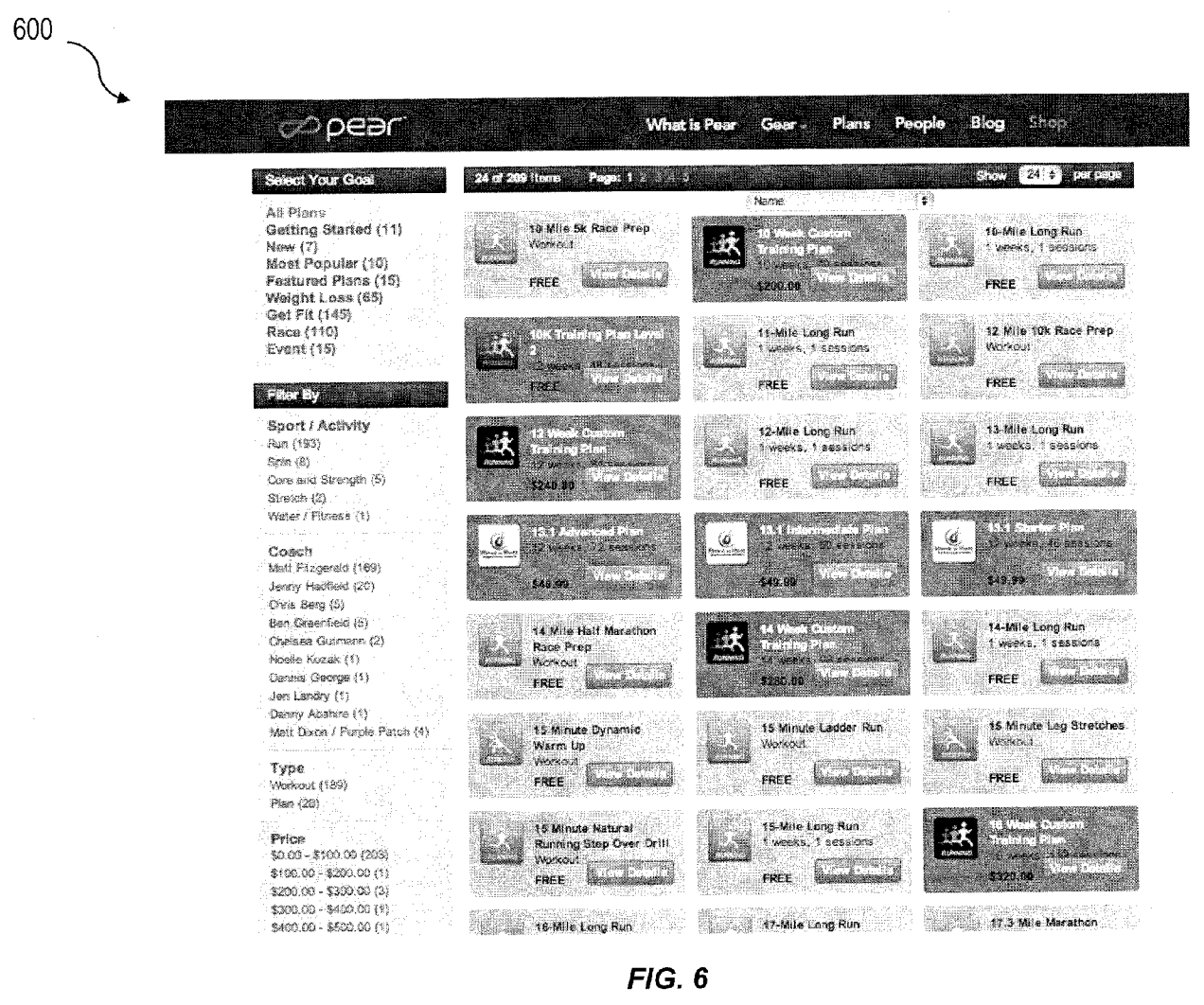

FIG. 5 is a view 500 of the TCS that shows various training plans which are available. A user can select one or more of these training plans so that they can be downloaded to or otherwise associated with the PD for the user. The presented training plans can be filtered based on various criteria including fitness goals of the user, activity types, and particular coaches. FIG. 6 is a further view 600 showing further available training plans on the TCS and additional attributes/features which can be used to categorize or otherwise sort/filter the training plans presented to the user. In some cases, individual workouts can be displayed as opposed to training plans which include multiple workouts. The TCS portal views can include advertising relating to training plans or other wellness/fitness products or services.

The TCS can be configured so that a user can be rewarded based on the TC performance with 'points' or other incentives. Points could be used to buy new TCs, TPs, or other product in lieu of money or they can be given to charitable causes. In addition, TCS can allow a user share TC log files and TC results with others (e.g., post on FACEBOOK, TWITTER, etc.). On the TCS, the user can see what TC is downloaded to the PD and be able to sync up to get most recent TC files (or new versions of the PD firmware). The user can also view the upcoming TP or TC in a form of a calendar and arrange the TC for any given day. The upcoming TCs and schedule can be emailed, messaged (SMS, MMS), etc. to the user. The calendar can also be synced with other electronic calendar such as GOOGLE Calendar. The TCS can generate a log characterizing each TC user has executed (i.e., used in a workout) and if the user had uploaded the log file, the TCS can plot the performance to the user for any given TC. TCS can also measure user performance relative to other users and have them compete or just compare to averages of other similar users.

Various analytics and graphical representations can be generated by the TCS (either directly via a web service) or as part of client software on a media source or on the PD. For example, users can overlay graphically different TC to see variances and changes or improvements. The TCS can also recommend nutrition recommendations based on the users calorie burn and fitness objectives (i.e. weight loss). TCS can be linked to other external nutrition systems (e.g., via web services, etc.) that read TC log files. The TCS can be configured to host competitions of users to execute a TC or TP and compare performances based on uploaded TC log files. Moreover, the TCS can be configured so that users can connect and follow other users and challenge other users to perform TC, etc.

Figure 7:
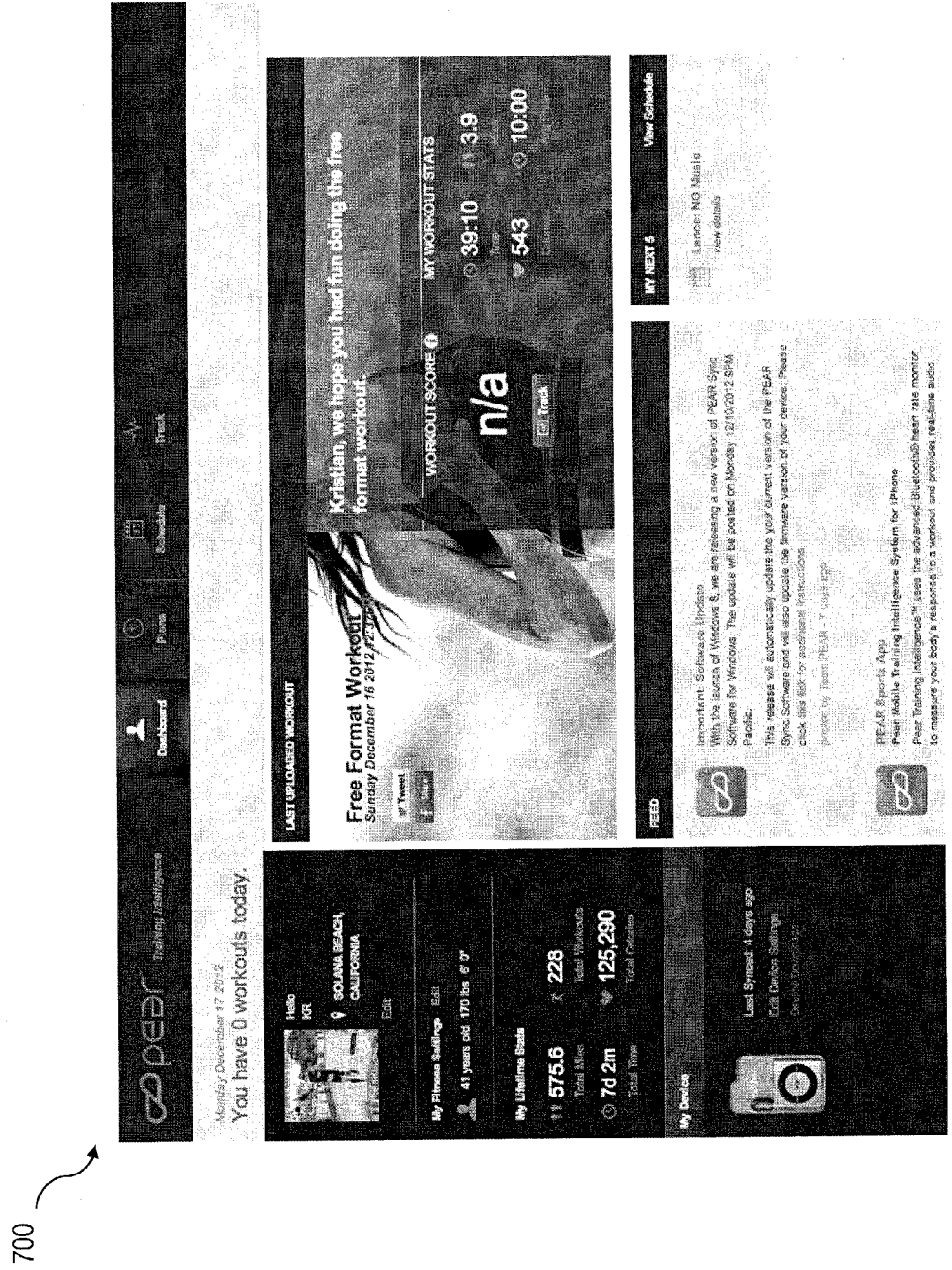
FIG. 7 is a view of a dashboard characterizing various workout metrics relating to a user.
Figure 8:
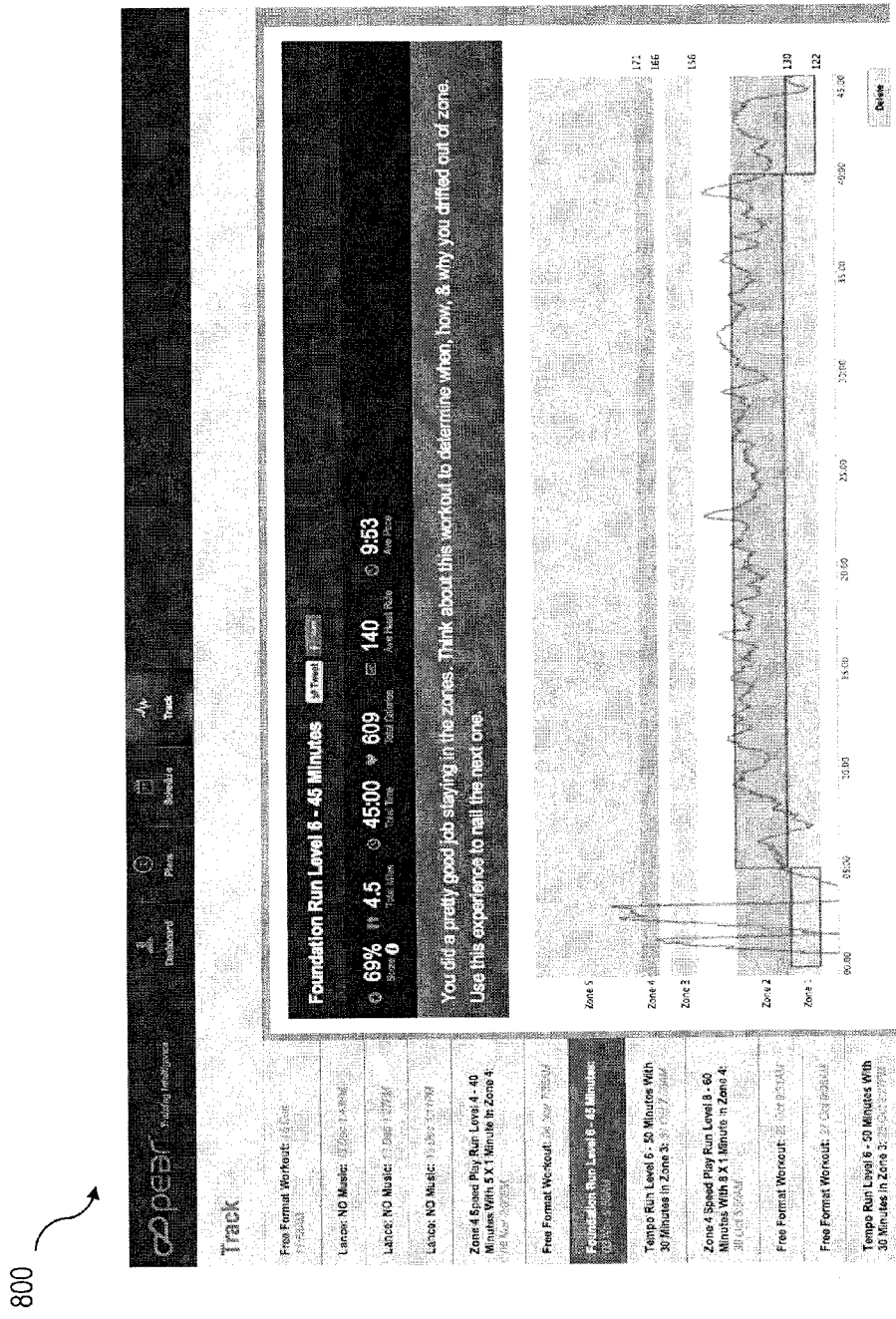
FIG. 8 is a view illustrating a training log for a user and performance analytics regarding one or more workouts.

FIGS. 7 and 8 are views 700, 800 characterizing various performance metrics in relation to a user. Such analytics can be based on a user's performance in a single workout and/or they can be based on a user's performance across multiple workouts/training plans. The view 700 of FIG. 7 shows profile information for a user as well as a score for a workout, and various stats regarding the workout (e.g., total time, distance travelled, calories burned, and average pace). The view 800 of FIG. 8 shows a user's performance in relation to specific zones (i.e., segments) of a workout having differing performance parameters/guidelines. These analytics can be generated, for example, by analyzing a training log of a user (that characterizes his or her performance during a workout) for compliance within the parameters specified by the training plan/workout.

Training Content Generator (TCG).

Figure 10:
FIG. 10 is a view of an interface for generating workouts.

The TCG is a platform for coaches and users to create and publish new TC. The TCG can be a software application resident on the PD or a client computer (laptop, PC, smart phone, media player, etc.) or it can be a software application on a remote or on premise computer accessible via, for example, the Internet. FIG. 10 is a view 1000 of a sample interface for specifying zones/times for a workout, associated performance parameters, and corresponding guidance. Using this interface, a coach can design a workout, associated prompts, training zones, timing and the like. Fields can include notes that characterize certain aspects of the workout.

The platform executing/interfacing with the TCG can have an audio input (to allow for voice-based instructions and other interaction). The TCG can offer an easy visual way to building and publishing (drag and drop) TC steps, assigning activity intensities/set and workout goals/nutrition tips/hydration notes for each step within the workout. The TCG can assign coaching audio files for each performance scenario. These audio files can be selected based on predetermined logic, or based on dynamic modeling based on events that have happened during the exercise. TCG can also allow inserting of commercial messages.

Figure 9:
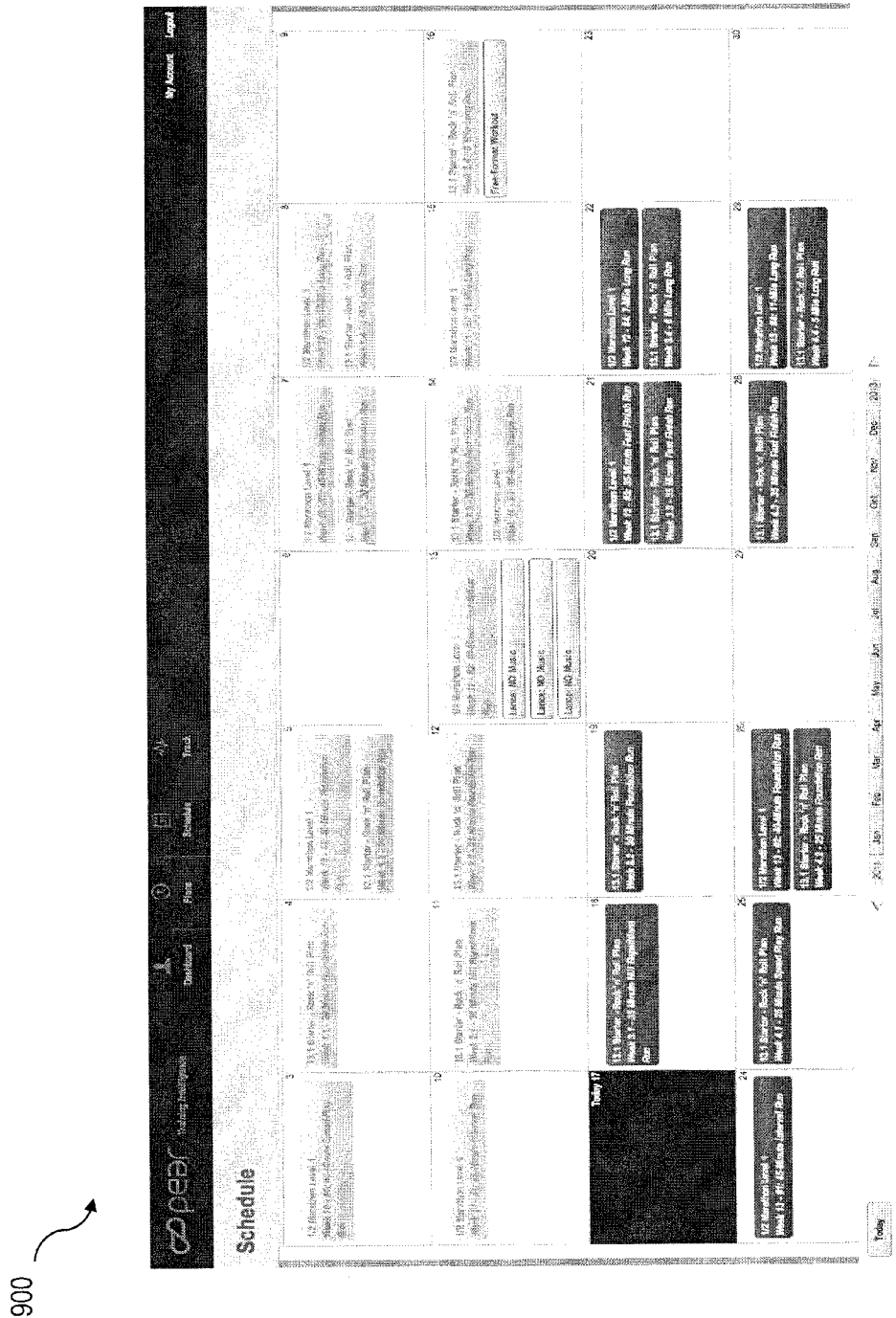
FIG. 9 is a view illustrating scheduled workouts specified by a training plan for a user.

The TCG can also offer the coach a method to record the personal coaching audio files for the TC. The TCG can also compress such audio files to be more suitable for the PD. The TCG can also be configured to provide a user-friendly ability for a coach to upload to allow for the publishing of the TC for any give user and add it to the user's TC library, TP or calendar (FIG. 9 shows a view 900 of various scheduled workouts for a user based on one or more training plans). Via the TCG or TCS users and coaches can interact via instant messaging, email, TWITTER, FACEBOOK, etc. Moreover, the TCG can also be configured to include premium content which must be purchased by users. For example, a coach can assign a price to the content and charge users for the use/download of this content. The TC can be posted on the TCS where users can see it, buy it and download it to their PD. The user can preview the TC by listening samples of the audio.

As mentioned above, the PD delivers audio information to a user in any of the configurations illustrated in the diagram 200 of FIG. 2. This audio information is advantageous because most Heart Rate Monitors (HRM) are watch/wrist mounted devices. This limits the practical size of the display. Furthermore, the amount and type of information that can be displayed is limited. Very small type/font is not practical to read while exercising (i.e. running) With older age, it is likely that a person is not able to read such a display without reading glasses. Some HRMS have added beeps to alert the user for certain actions. Such beeps are also limited and possibly hard to hear during a run, especially if the person is listening to music via headphones (this is very typical).

Figure 3:
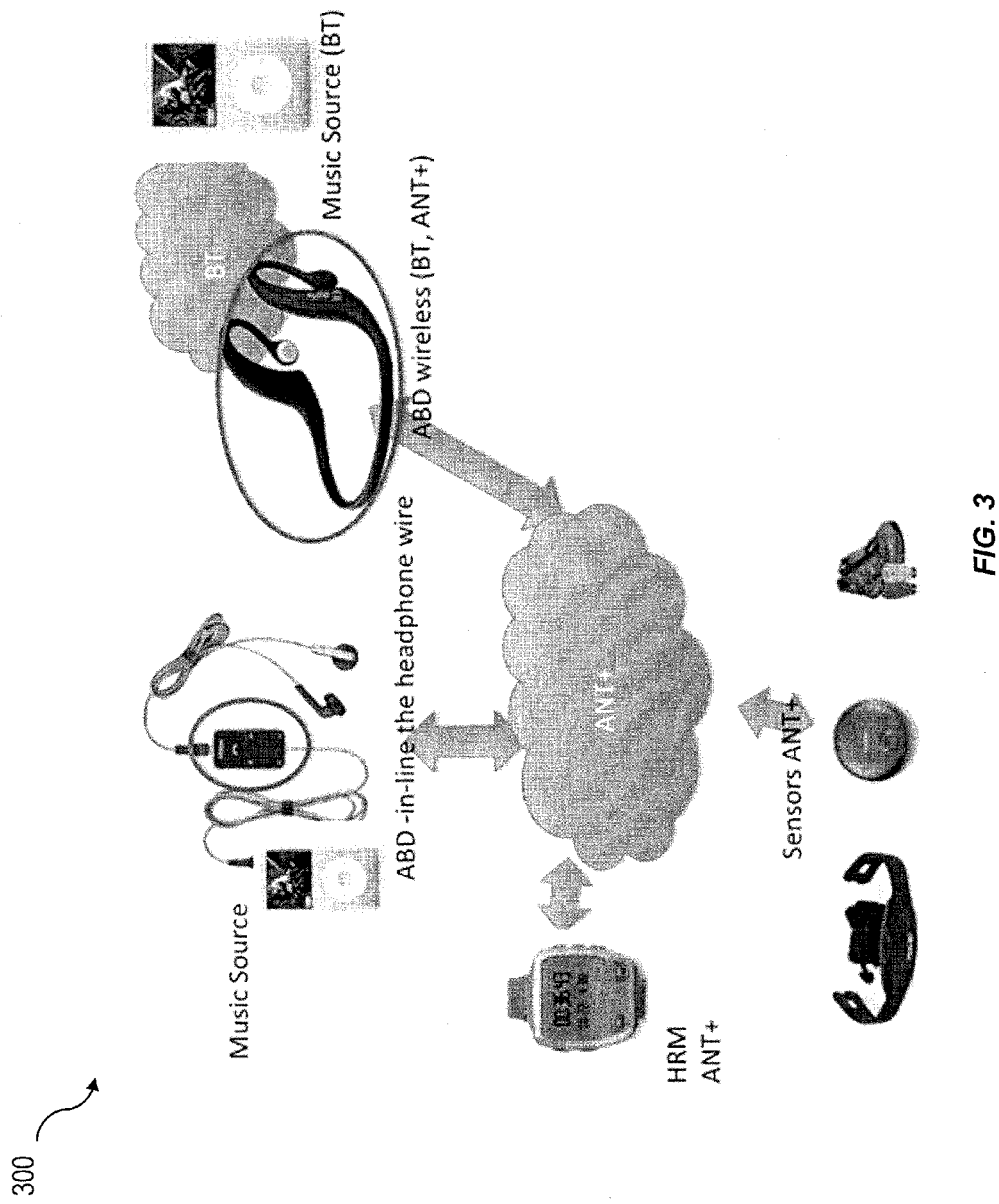
FIG. 3 is a diagram illustrating another implementation of an integrated training system.

The PD can be characterized as an extension of the LCD display of HRMs for athletes. The audio feature can be described as an Audio Based Display (ABD) system that is/can be integrated to the headphones. With reference to the diagram 300 of FIG. 3, the ADB can automatically connect wirelessly (e.g. ANT+) to the HRM and related sensors (e.g., accelerometers, pace sensor, etc.). The ADB can switch to HRM messages (or other audio guidance) and not play music to speakers during HRM messages, or the volume of the music can be temporarily lowered and the messages/guidance can be played over the music. The HRM message/guidance can be delivered in a push fashion (automatically sent to the user based on performance data obtained from the sensors and/or based on time intervals) or it can be delivered in a pull fashion (e.g., a user can activate a button on the PD to get stats relate to the workout including HR, miles travelled, calories burned, etc.).

The ADB can have buttons for a user to initiate the ADB settings, or request information from the HRM. The ADB can also include a microphone for receiving voice input from the user much like car navigation systems—and the PD may give all information via audio. The user can, for example, request, on-the fly, different TC content and/or request data from the sensors (e.g., heart rate).

In addition, HRMs are increasingly complex to set up and most users do not pay attention to the complicated setup or manuals for the HRM. The ADB can enable voice guides/user guide for the HRM use and settings.

Automatic HR Training Zone Setup.

It can also be difficult for a user to understand the HR values and certain HR training zones. Each person's heart is different and the heart muscle changes over fitness and age (the HR zones are described as a % of max HR or % of Lactate Threshold HR). Most users do now know their max heart rate (or LTHR) to be able to calculate and determine accurate HR training zones.

Many formulas (such as 220-age) have been developed to average and estimate HR Max and then a % of the Max is used to determine different zones. Even this is still cumbersome and requires math and good memory to remember each 5-7 zones start and end values. The current subject matter can use a protocol involving a HR test workout to receive the user's HR values that are then used automatically to adjust the correct training zones. To do this, the user can download the HR test TC to his/her PD and start the workout. The workout can guide the user to increase intensity gradually until a certain LT HR is reached. This protocol is carefully drafted to guide the user accurately and consistently to a certain Perceived Rate of Exertion level (RPE). It has been demonstrated that this method is reliable to assess users LTHR. During this process the user does not need to hear or know anything about his/her HR values. Everything is calculated automatically. The PD and TCS (or other server) can receive the log file of this workout and determine the HR value (while eliminating obvious error readings) from the second last step of this workout (the Max HR during the second last segment will be a close approximation of user's LTHR.) The values can then be checked against the known formulas (e.g. 220-age) to further verify that the measurement data is accurate and no gross errors are made. The PD and TCS can then store the user's zones under his/her fitness profile and scale all future workouts to these zones.

A user need not get their HR to max values (dangerous for unfit people) and user need not know their HR values—everything relating to target HR and monitoring of same can be done automatically. Also, as the user's fitness improves the zones are likely to change. The TCS and PD can enable the user to repeat this test multiple times to keep the HR training zones current.

Combination of Audio Files and Workouts.

In order for a user to get appropriate feedback during a workout (WO), certain audio files need to be available at the PD that are associated with the WO. As described above, the TCS can combine the authentic coaching prompts with the WO. In addition certain non-coaching system prompts can be used to alert the user.

To get most authentic training, the PD is not using a generic prompts to guide the user. Instead, each WO is combined with relevant coaching audio that is interacting with the HR or other sensor values. The coach can construct the WO by describing each step of the WO and what are the coaching parameters during this step—and what are the desired coaching prompts. The coach can then be asked to record the prompts with the TCG (or alternatively the coach can select pre-recorded coaching guidance).

The coaching prompts can be played at any given time, distance, pace/speed, cadence, calorie burned. In addition, effort level coaching can be set (in-range, above range and below range) to help guide the user to either maintain, decrease or increase his/her effort during the step of the WO. As stated above, the benefit of the current subject matter is that it allows more authentic personalized coaching that is more motivating vs. generic 'answering machine' voice and can be much more accurate because it is interacting with actual user performance . . . . In addition, the current subject matter also enables easy use of languages as the coach can record with any language.

Use of Modeling to Teach User from Others/Examples—Running Form Guidance—Real-Time.

The current options for running form training in real-time is to have a coach next to you to only visually observe and coach the User. This is not practical in many cases and would be very expensive for the user to hire a coach for each run. The alternative is to have someone take a video of the user running and then post analyze it by coach. The post analysis does not result in effective feedback and it is not done in real-time and with instant feedback.

The TCS can enable people to learn running form and get real-time instant feedback of running form that can effectively improve the runners economy and injury prevention. The PD can measure user running cadence (with the use of a foot pod as one of the sensors in communication with the PD) and recommend a higher cadence to promote mid-foot striking vs. slow cadence and possible heel striking. Further other sensors can be worn by or coupled to the user to detect his or her form while performing/undergoing fitness and/or wellness movements. For example, sensors such as gyro, position sensors for other sports measuring acceleration, position, swing, repetition, force, etc. can be utilized and such sensors can be embedded in compatible sporting goods like apparel, bikes, rackets, clubs, straps, etc. The sensors can monitor both large movements of the user—but also fine movements (especially as it relates to resistance training/weight training, etc.).

By modeling good runners (recording vast amount of runner data and their related sensor readings and correlating it with User profile), the TCS can be trained to compare the user to others and suggest improvements to the running form. The use of modeling data can also be used to identify more optimal/economical movements for activities such as running and swimming.

PD Architecture.

Figure 4:
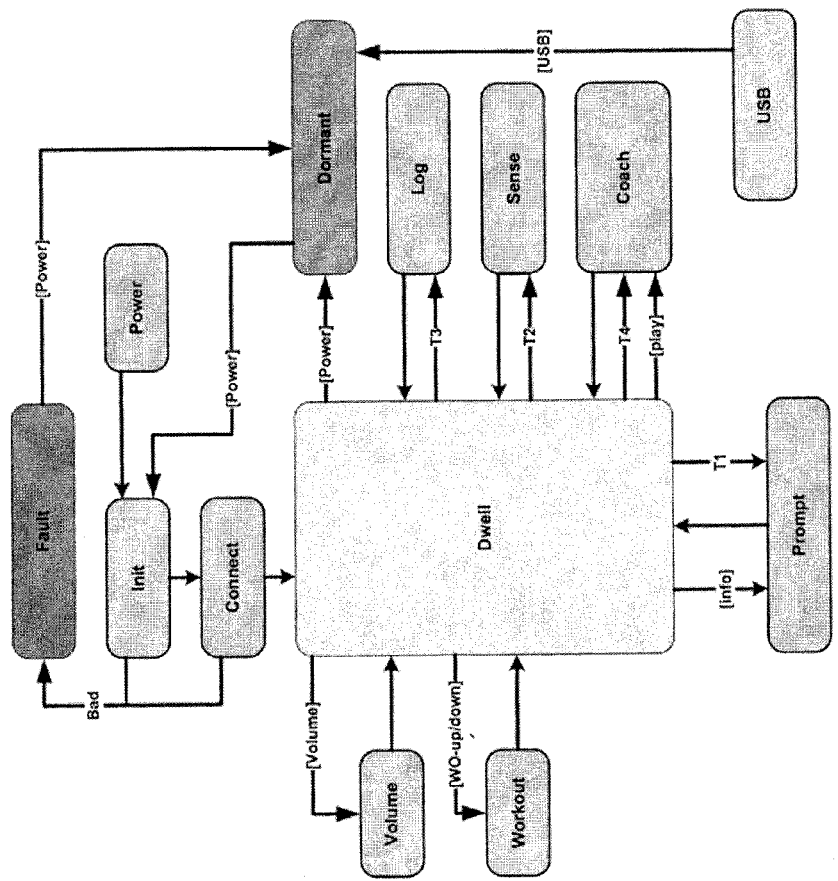
FIG. 4 is a diagram illustrating various operational states of an integrated training system.

The PD behavior can be defined in terms of states, transitions and events. The PD firmware can be in one and only one defined state at any given time. While in a specific state, PD software follows a sequence of activities and upon completion, transitions to another state. Some transitions depend on events such as timer expiration or user button press. A summary of these states, transitions and events is depicted in the state diagram 400 of FIG. 4.

STATE_POWER. This is the state that the PD finds itself upon transitioning from no power to when power is provided to the PD device. The device goes through this state only once after power-up. Hardware initialization that needs to be done once and is common to the rest of the states is implemented here.

STATE_DORMANT. To conserve battery and extend the use of PD, a special power save mode is developed. In this state the PD requires the minimum amount of power. The main purpose of this state is to draw minimum power between usages of the device. A transition out of this state is required before any use.

STATE_INIT. This state is where the PD hardware is verified. Battery status, radio and sound logic is tested.

STATE_CONNECT. In this state, the PD is trying to connect to near-by sensors.

STATE_FAULT. This state is reached after failed hardware test or pairing in STATE_INIT.

STATE_DWELL. This is the normal active state, while is use and with functional hardware. In this state, the MCU draws minimal power while still responding to the user buttons, to internally generated timer events and to external interrupts.

Upon entering this state from STATE_CONNECT, the volume is adjusted to "soft start". This way the user is not blasted by too loud volume.

STATE_PROMPT. This state is reached when the user wishes to hear prompts. Output audio is rerouted from the external source to the internal prompts.

Data previously stored during STATE_SENSE is used to index the corresponding "number prompt". It can be heart rate or distance based on workout type and paired sensors.

When a transition to this state is from [info] transition, then the current voice routing is toggled between outputting to the headphone from prompts or from the 3.5 mm input jack.

STATE_SENSE. This state is reached periodically when a predetermined timer expires or at any given time as determined by the workout file. Sensed data is gathered from connected sensor devices, formatted and stored.

STATE_COACH. This state is reached periodically when a predetermined timer expires. Coaching is active or not based on inputs from the [play] button. While coaching is active a [play] push will toggle to the passive state.

STATE_USB. This state is reached when user plugs the PD into an active USB host port. When a user unplugged the PD from the USB host, a transition to STATE_DORMANT takes place.

In this USB state, the PD battery is charged by on-board power circuitry. The status of charge progress is conveyed to the user via the LEDs. USB data interface is supported in this state.

STATE_VOLUME. This state is reached when the user presses the [Volume] button. The device volume will increment one level per press and will back to minimum volume after the maximum volume is reached. For every [volume] press the prompt "volume" will be played once.

STATE_WORKOUT. This state is reached when a user presses the [WO-up] or [WO-down] buttons. The workout selected is the next workout that was current before entering this state or the previous workout—based on up or down push. When done with this state PD transitions to STATE_DWELL. A voice prompt is announcing the current workout title.

Actual workout is selected when a user presses the [Play] button. When a workout is already selected the [Play] button is used to control the prompts or [pause/stop] the workout.

STATE_LOG. This state logs the current workout activity data into non-volatile memory.

When [pause] key is pressed, a special marker is recorded and then logging is suspended. Logging resumes when [play] key is pressed (also a special marker can be added to the log file).

System transitions. Transitions among states are one directional arrow between two states. These arrows have two type—named and un-named. Un-named arrow depicts a natural transition from one state to the next state upon normal exiting out of the current state.

Named transitions are based on events described in more details for each such named transition below:

TRAN_BAD◊ This is an exit from STATE_INIT or STATE_CONNECT with testing resulting in errors.

TRAN_KEY_VOLUME◊ This is a single short press of the [Volume] key.

TRAN_KEY_POWER

This is a single short press of the [Power] key. The press needs to be longer than [0.5] seconds to be a valid press.

TRAN_KEY_INFO◊ This is a single short press of the [Info] key

TRAN_KEY_WORKOUT◊ This is a single short press of the [WO-up] or [WO-down] key

TRAN_KEY_PLAY◊ This is a single short press of the [Play] key.

TRAN_KEY_INFO◊ This is a single short press of the [Info] key.

TRAN_T1◊ This is timer generated transition to generate voice prompts.

TRAN_T2◊ This is an ANT radio interrupt indicating new data from a sensor.

TRAN_T3

This is the expiration of a timer set to, periodically, store activity data from sensors into non-volatile memory.

TRAN_T4◊ This is the expiration of a timer set to, periodically, enter execution of coaching TRAN_USB This is a transition from when PD is connected to USB to when PD is not connected to USB.

Figure 12:
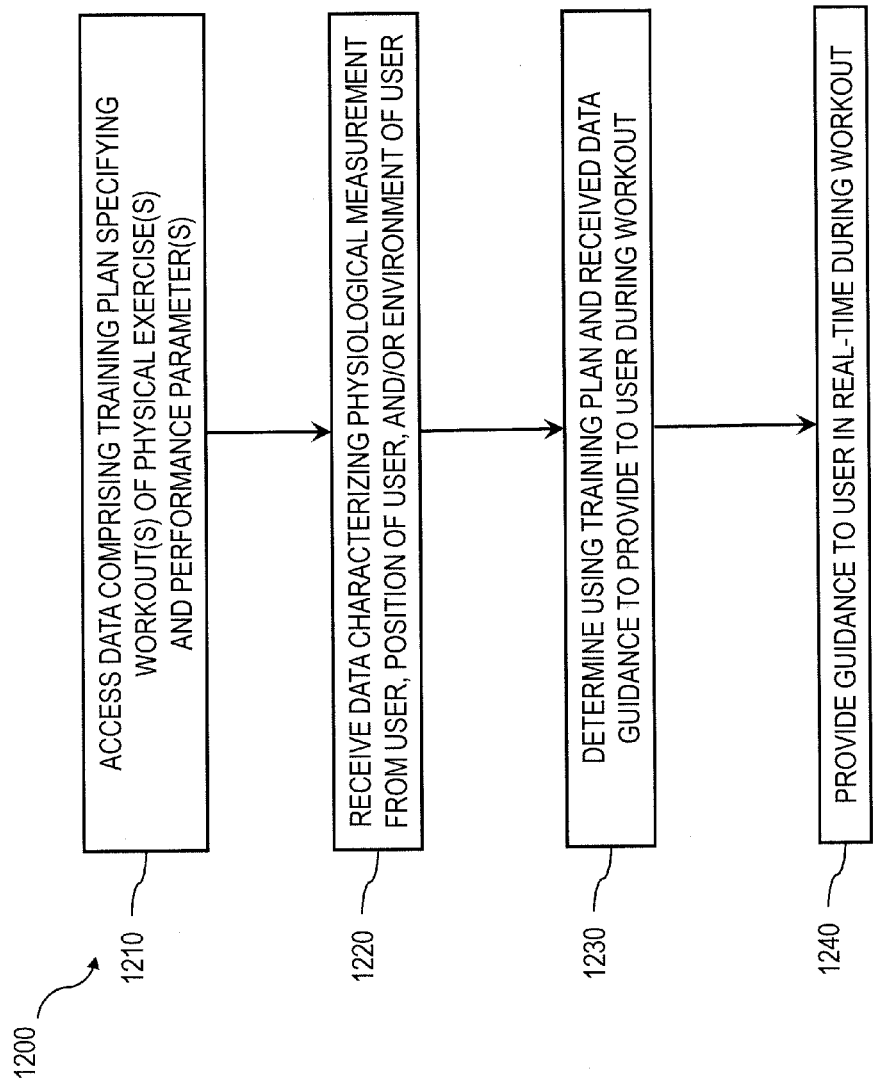
FIG. 12 is a process flow diagram illustrating monitoring performance of a user during a workout and providing feedback according to a training plan.

FIGS. 12-15 illustrate various process flow diagrams for implementing the subject matter described herein. FIG. 12 is a diagram 1200 in which, at 1210, data is accessing data that includes a training plan specifying at least one workout.

Each workout in turn specifies at least one physical exercise and associated performance parameters relating to the at least one physical exercise. In addition, at 1220, data is received, during a workout by a user according to the training plan, that characterizes at least one of a physiological measurement of the user, a position of the user, and an environment of the user. Thereafter, at 1230, it is determined based on the received data and using the training plan, guidance to provide to the user during the workout in order to comply with the training plan and the associated performance parameters. Guidance is then provided, at 1240, in real-time to the user during the workout to allow the user to adjust his or her workout accordingly.

Figure 13:
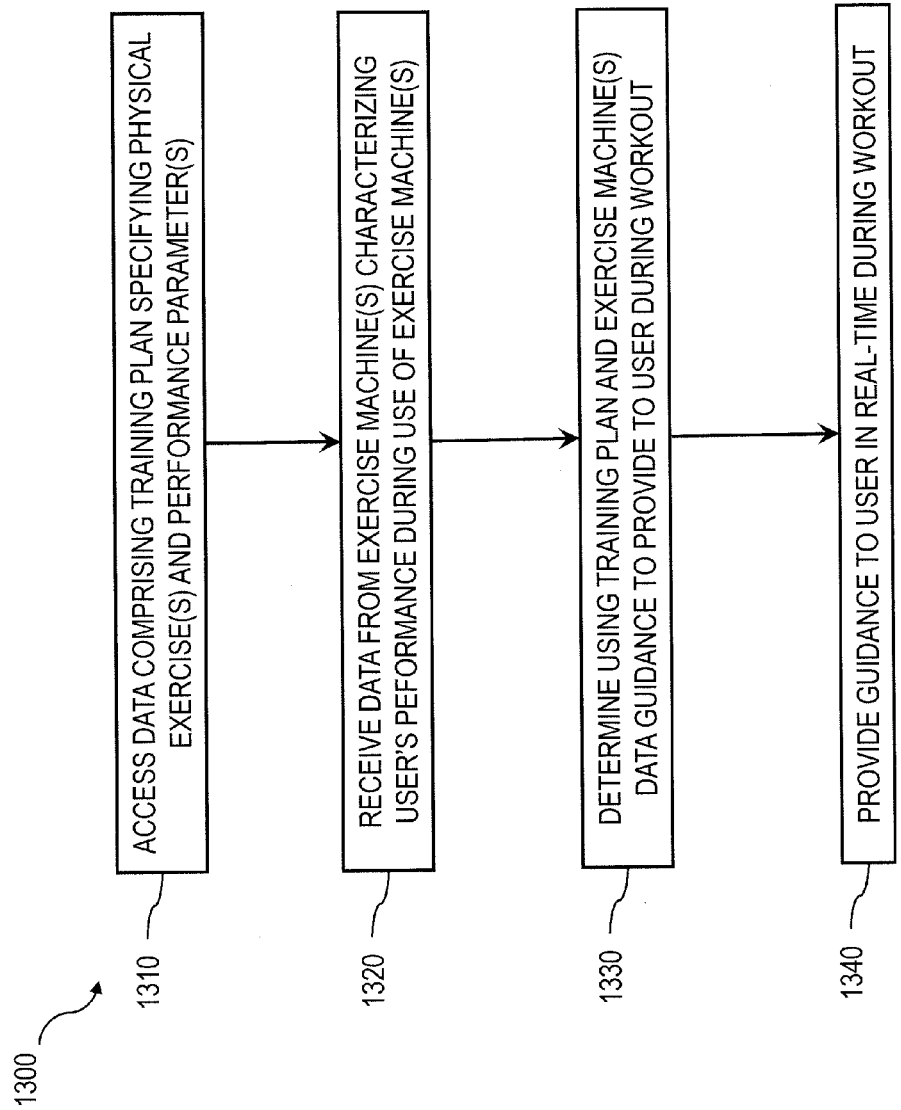
FIG. 13 is a process flow diagram illustrating monitoring performance of a user during a workout using an exercise machine and providing feedback according to a training plan.

FIG. 13 is a diagram 1300 in which, at 1310, data is accessed that comprises a training plan specifying at least one physical exercise and associated performance parameters. In addition, at 1320, data is received from at least one exercise machine characterizing interaction by a user with the exercise machine during a workout. It is determined, at 1330, based on the received data and using the training plan, guidance to provide to the user during the workout in order to comply with the training plan. Guidance is then provided, at 1340, to the user in real-time during the workout to allow the user to adjust his or her workout accordingly.

Figure 14:
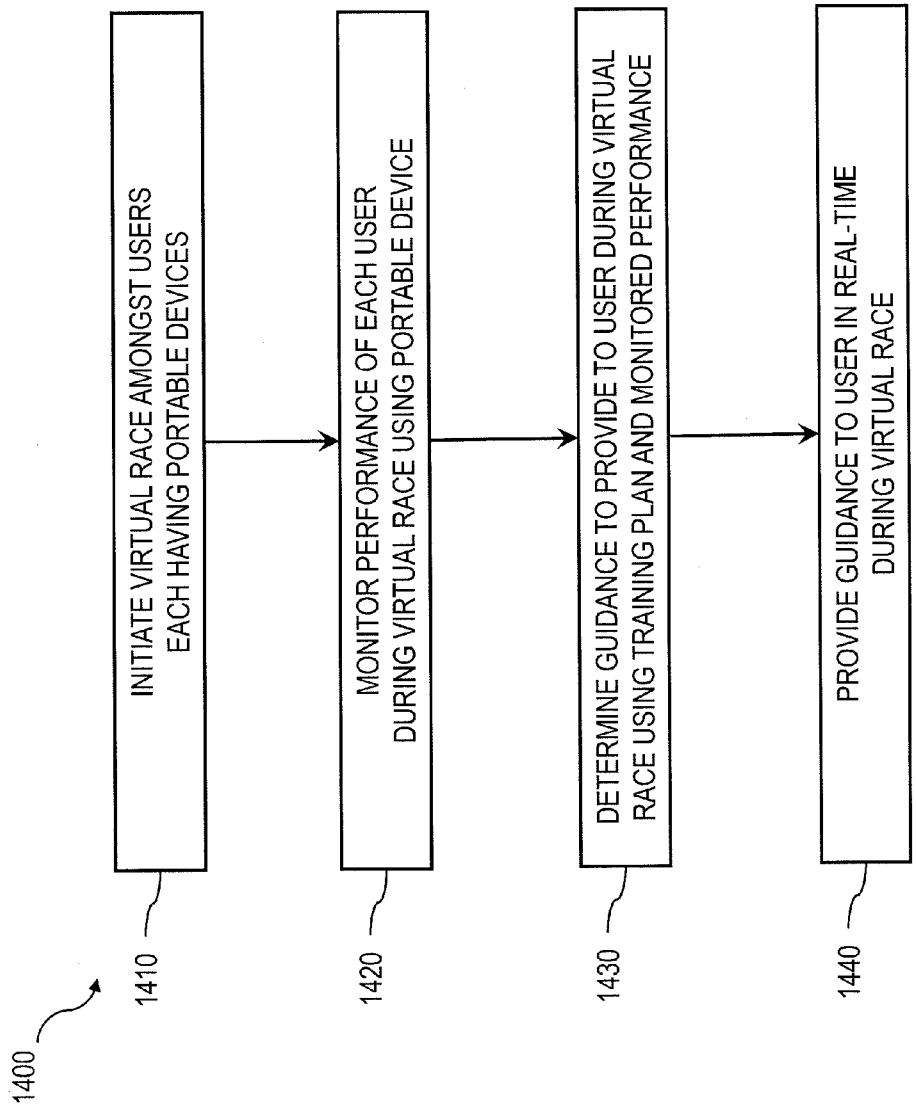
FIG. 14 is a process flow diagram illustrating initiating a virtual race amongst a plurality of users of portable devices and providing feedback to the users according to one or more training plans during the virtual race.

FIG. 14 is a diagram 1400 in which, at 1410, a virtual race is initiated amongst a plurality of portable devices. Each portable device is used by a different single user of a plurality of users and includes data characterizing a training plan associated with the virtual race. Thereafter, at 1420, performance of each user is monitored while engaging in the virtual race using the respective portable devices. It is determined, at 1430, based on the monitored performance and using the training plan, guidance to provide to each user during the workout in order to comply with the training plan. Guidance is then provided, at 1440, to the user in real-time during the virtual race to allow each user to adjust his or her performance accordingly.

Figure 15:
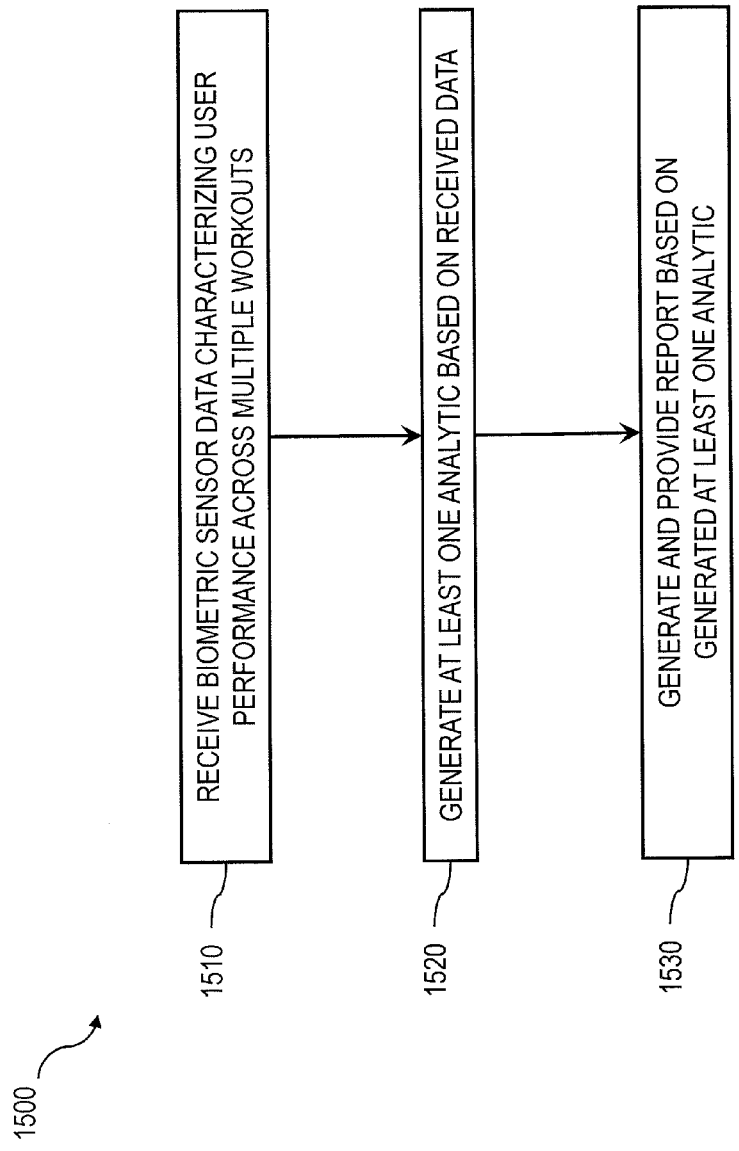
FIG. 15 is a process flow diagram illustrating analytics relating to the performance of users during workouts according to training plans.

FIG. 15 is a diagram 1500 in which, at 1510, data is received that is generated from at least one biometric sensor characterizing performance of a user in connection with each of a plurality of a plurality of workouts in relation to respective training plans. Data is generated, at 1520, that comprises at least one analytic characterizing the performance of the user in relation to the training plans. Thereafter, at 1530, data is generated and provided that comprises at least one report based on the generated at least one analytic and that provides a view of the at least one analytic.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for implementation by one or more data processors comprising:
    accessing, by at least one data processor of a portable physical exercise training device, data comprising a training plan, the training plan specifying at least one workout, each workout specifying at least one physical exercise and associated performance parameters relating to the at least one physical exercise;
    receiving, by the at least one data processor over a wireless connection using one of a plurality of wireless protocols, while a user is completing a workout specified by the training plan, data characterizing at least one of a physiological measurement of the user, a position of the user, and an environment of the user, the receiving further comprising bridging, by the at least one data processor of the portable physical exercise training device, the plurality of wireless protocols to make the data characterizing at least one of a physiological measurement of the user, a position of the user, and an environment of the user interoperable by the portable physical exercise training device; and
    determining, by the at least one data processor and based on the received interoperable data and using the training plan, guidance to provide to the user during the workout in order to comply with the training plan and the associated performance parameters; and
    initiating, by the at least one data processor, provision of the guidance to the user in real-time during the workout to allow the user to adjust his or her workout accordingly;
    wherein the training plan is selected by the at least one data processor and based on the interoperable data characterized by the at least one of the physiological measurement of the user, the position of the user, and the environment of the user received during a previously completed training plan;
    wherein at least a portion of the data is generated by at least one sensor;
    wherein the at least one sensor comprises at least one biometric sensor characterizing at least one physiological measurement taken from the user during the workout;
    wherein the data from the at least one biometric sensor is received continuously and in real-time during the workout, and wherein the guidance adapts based on the data received from the at least one biometric sensor, the training plan, and the associated performance parameters;
    wherein the training plan comprises training content that coaches the user follow to an exercise routine, wherein training content is used to provide adjustable guidance to the user in real-time based on the performance of the user;
    wherein the guidance is variable based on criteria specified by the training content, the criteria comprising one or more of calories burned by the user during the workout, weight loss of the user during the workout, and temperature of the user during workout; and
    wherein the training content is broadcasted to a plurality of users concurrently engaging in the workout.

2. A method as in claim 1, wherein the at least one biometric sensor characterizes distance travelled by the user during the workout.

3. A method as in claim 1, wherein the at least one biometric sensor characterizes at least one of: heart rate of the user, a distance travelled by the user during the workout, a current speed of the user during the workout, a power metric relating to the workout, a cadence of the user during the workout, a number of calories burned by the user, a breathing rate of the user, a galvanic skin response of the user, and body temperature of the user.

4. A method as in claim 1, wherein the guidance comprises one or more of: audio guidance and video guidance.

5. A method as in claim 1, wherein the training plan comprises a plurality of workouts each having different training criteria.

6. A method as in claim 5, wherein at least two of the workouts have differing associated performance parameters.

7. A method as in claim 1, wherein the accessing, receiving, and determining are performed by a portable device worn by the user comprising at least one data processor and memory.

8. A method as in claim 7, wherein the portable device comprises at least one of headphones and a display interface.

9. A method as in claim 8, wherein the portable device and the headphones are integrated.

10. A method as in claim 7, wherein the portable device wirelessly communicates with at least one sensor characterizing performance of the user during the workout.

11. A method as in claim 7, wherein the portable device is a mobile phone.

12. A method as in claim 1, wherein the training plan is selected among a plurality of training plans by the user via an online portal, and each training plan comprises metadata characterizing one or more attributes of the training plan, the metadata being searchable by the user via the online portal.

13. A method as in claim 12, wherein each workout comprises metadata characterizing one or more attributes of the workout, the metadata being searchable by the user via the online portal.

14. A method as in claim 1, wherein the guidance comprises information characterizing at least one of: elapsed time of the workout, a distance travelled by the user during the workout, a current speed of the user during the workout, a power metric relating to the workout, a cadence of the user during the workout, a number of calories burned by the user, a breathing rate of the user, a galvanic skin response of the user, and body temperature of the user.

15. A method as in claim 1, wherein the guidance comprises at least one of: a current time, a current altitude of the user, a current location of the user, weather at the current location of the user, messages from third parties to the user, hydration prompts to the user, and food prompts to the user.

16. A method as in claim 1, wherein the training content is stored on a training content server, the training content server being accessible by at least one computer network, the training content server storing a profile for the user comprising performance data regarding historical workouts and associated training plans.

17. A method as in claim 1, wherein the training plan is generated using a training content generator platform, the training content generator plan provides a graphical user interface for generating training plans and workouts.

18. A method as in claim 17, wherein the training content generator allows a user to specify, for a workout, one or more of: activity intensities, nutrition guidelines, and hydration guidelines.

19. A method as in claim 1, wherein the guidance is provided in response to the user activating an element on a portable device worn by the user during the workout, or the guidance is pushed to the user during the workout based on the received data.

20. A method as in claim 1, wherein the training plan is selected based on a heart rate test previously executed by the user, the heart rate test provides guidance to the user requiring various levels of exertion while, at the same time, monitoring a heart rate of the user.

21. A method as in claim 1, further comprising:
initiating, by at least one data processor, provision of at least one advertisement to the user during the workout.

22. A method for implementation by one or more data processors comprising:
accessing, by at least one data processor of a portable physical exercise training device, data comprising a training plan, the training plan specifying at least one physical exercise and associated performance parameters;
receiving, by the at least one data processor over a wireless connection using one of a plurality of wireless protocols, data from at least one exercise machine characterizing interaction by a user with the exercise machine while a user is completing a workout, the receiving further comprising bridging, by the at least one data processor of the portable physical exercise training device, the plurality of wireless protocols to make the data from at least one exercise machine characterizing interaction by a user with the exercise machine interoperable by the portable physical exercise training device;
determining, by the at least one data processor and based on the received interoperable data and using the training plan, guidance to provide to the user during the workout in order to comply with the training plan; and
initiating, by the at least one data processor, provision of the guidance to the user in real-time during the workout to allow the user to adjust his or her workout accordingly by transmitting data encapsulating the guidance to a mobile phone worn by the user, the data encapsulating the guidance being transmitted in real-time while the user is completing the workout;
wherein at least a portion of the data is generated by at least one sensor;
wherein the at least one sensor comprises at least one biometric sensor characterizing at least one physiological measurement taken from the user during the workout;
wherein the data from the at least one biometric sensor is received continuously and in real-time during the workout, and wherein the guidance adapts based on the data received from the at least one biometric sensor, the training plan, and the associated performance parameters;
wherein the training plan comprises training content that coaches the user follow to an exercise routine, wherein training content is used to provide adjustable guidance to the user in real-time based on the performance of the user;
wherein the guidance is variable based on criteria specified by the training content, the criteria comprising one or more of calories burned by the user during the workout, weight loss of the user during the workout, and temperature of the user during workout; and
wherein the training content is broadcasted to a plurality of users concurrently engaging in the workout.

* * * * *